(12) United States Patent
Ejima et al.

(10) Patent No.: US 9,131,292 B2
(45) Date of Patent: Sep. 8, 2015

(54) WIRELESS MICROPHONE SYSTEM

(75) Inventors: Ken'ichi Ejima, Kobe (JP); Takashi Ogura, Kobe (JP); Koji Moriguchi, Kobe (JP)

(73) Assignee: TOA Corporation, Hyogo-ken (JP)

( * ) Notice: Subject to any disclaimer, the term of this patent is extended or adjusted under 35 U.S.C. 154(b) by 300 days.

(21) Appl. No.: 13/992,653

(22) PCT Filed: Dec. 9, 2011

(86) PCT No.: PCT/JP2011/078608
§ 371 (c)(1),
(2), (4) Date: Jun. 7, 2013

(87) PCT Pub. No.: WO2012/077802
PCT Pub. Date: Jun. 14, 2012

(65) Prior Publication Data
US 2013/0251173 A1 Sep. 26, 2013

(30) Foreign Application Priority Data
Dec. 10, 2010 (JP) .................. 2010-276024

(51) Int. Cl.
*H04R 3/00* (2006.01)
*H04L 9/00* (2006.01)
*H04R 1/08* (2006.01)

(52) U.S. Cl.
CPC .. *H04R 3/00* (2013.01); *H04L 9/00* (2013.01); *H04R 1/08* (2013.01); *H04R 2420/07* (2013.01)

(58) Field of Classification Search
None
See application file for complete search history.

(56) References Cited

U.S. PATENT DOCUMENTS

| 7,522,730 | B2 * | 4/2009 | Vaughan et al. ............... 380/275 |
| 8,542,834 | B1 | 9/2013 | Feikis et al. |
| 2003/0087667 | A1 | 5/2003 | Taniguchi et al. |
| 2005/0235147 | A1 | 10/2005 | Vaughan et al. |
| 2006/0045287 | A1 * | 3/2006 | Abrams et al. .................. 381/77 |
| 2007/0168819 | A1 * | 7/2007 | Buhe et al. .................... 714/746 |

FOREIGN PATENT DOCUMENTS

| CN | 1417952 A | 5/2003 |
| CN | 1707993 A | 12/2005 |
| JP | 64-90635 A | 4/1989 |
| JP | 4-200126 A | 7/1992 |
| JP | 4-304048 A | 10/1992 |
| JP | 4-313929 A | 11/1992 |
| JP | 7-298362 | 11/1995 |
| JP | 2005-258242 A | 9/2005 |
| JP | 2008-217671 A | 9/2008 |

* cited by examiner

*Primary Examiner* — Brenda Bernardi
(74) *Attorney, Agent, or Firm* — Patterson Thuente Pedersen, P.A.

(57) ABSTRACT

Provided is a wireless microphone system comprising a microphone and a wireless receiver, wherein the wireless microphone system is provided with: a normal communication mode in which communication is performed by using a normal unique word (UWN) preset in both the microphone and the wireless receiver devices; a confidential setting mode in which a confidential unique word (UWX) is transmitted without being set in either of said devices; and a confidential communication mode in which communication is performed by both said devices by using the confidential unique word (UWX) set by the confidential setting mode.

14 Claims, 12 Drawing Sheets

Fig.4A

Normal communication mode

| Normal Unique Word UWN | Audio Digital Signal |
|---|---|

Fig.4B

Privacy setting mode

| Normal Unique Word UWN | Privacy Unique Word UWX |
|---|---|

Fig.4C

Privacy communication mode

| Privacy Unique Word UWX | Audio Digital Signal |
|---|---|

Fig.5

|  | Microphone | Wireless Receiver | Unique Word Conformance | Communication Permitted |
|---|---|---|---|---|
| Normal Communication Mode | Normal Unique Word UWN | Normal Unique Word UWN | Conform | ○ |
| Privacy Setting Mode | Normal Unique Word UWN | Normal Unique Word UWN | Conform | ○ |
| Privacy Communication Mode | Privacy Unique Word UWX | Privacy Unique Word UWX | Conform | ○ |
|  | Privacy Unique Word UWX | Normal Unique Word UWN | Not Conform | X |

WIRELESS MICROPHONE SYSTEM

PRIORITY CLAIM

The present application is a National Phase entry of PCT Application No. PCT/JP2011/078608, filed Dec. 9, 2011, which application claims priority to JP Application No. 2010-276024, filed Dec. 10, 2010, which applications are hereby incorporated by reference in their entirety.

TECHNICAL FIELD

The present invention relates to a wireless microphone system including a microphone, which transmits a transmission signal containing an audio signal and additional information for processing the audio signal, and a wireless receiver, which receives the transmission signal and processes the audio signal contained in the received transmission signal based on the additional information.

BACKGROUND ART

Patent document 1 describes an example of a known technique related to the above wireless microphone system.

Patent document 1 describes a communication device in which spread spectrum communication is performed between a base unit and a sub-unit using a spread code sequence serving as an encryption key. This improves interference and increases the privacy of signals. The spread code sequence used by the sub-unit is transmitted from the base unit to the sub-unit when the sub-unit is set in a setting area of the base unit with a terminal of the sub-unit in contact with a charge terminal of the base unit.

PRIOR ART DOCUMENT

Patent Document

Patent Document 1: Japanese Laid-Open Patent Publication No. 7-298362

SUMMARY OF THE INVENTION

Demands are increasing for suppressing eavesdropping of wireless signals in wireless microphone system. For example, a wireless microphone may be used in a conference or the like. However, it is preferable that the contents of the conference not be leaked outside. This results in such a strong demand. To suppress eavesdropping of radio waves from the microphone, transmission signals may be encrypted with the spread code sequence or the like (refer to patent document 1). However, this would require each of the microphone and the wireless receiver to additionally include a bidirectional communication device that transmits and receives encryption keys. This results in the structure of the wireless microphone system becoming complex.

Accordingly, it is an object of the present invention to provide a wireless microphone system that allows for eavesdropping by a third party receiver to be suppressed with a simple structure.

Means for Solving the Problem

One aspect of the present invention provides a wireless microphone system including a microphone that transmits a transmission signal, which contains an audio signal and additional information for processing the audio signal, and a wireless receiver, which receives the transmission signal and processes the audio signal contained in the received transmission signal based on the additional information. The wireless microphone system includes a normal communication mode in which the microphone and the wireless receiver communicate using normal additional information as the additional information that is set in advance in the microphone and the wireless receiver, a privacy setting mode in which the microphone sets privacy additional information that differs from the normal additional information in the microphone and transmits the privacy additional information to the wireless receiver, and a privacy communication mode in which the microphone and the wireless receiver communicate using the privacy additional information serving as the additional information set in the microphone and the wireless receiver by the privacy setting mode.

In this configuration, the microphone transmits the privacy additional information to the wireless receiver in the privacy setting mode, and the microphone and the wireless receiver communicate based on the privacy additional information in the privacy communication mode. The communication of the privacy communication mode uses the privacy additional information, which differs from the normal additional information used in the normal communication mode, and thus suppresses eavesdropping of the transmission signal from the microphone by a wireless receiver of a third party. A simple configuration is achieved since the encryption key is not exchanged between the microphone and the wireless receiver as in the technique that encrypts the audio signal.

Preferably, the microphone includes a transmission unit that transmits a normal transmission signal in which the normal additional information is added to the audio signal, a privacy transmission signal in which the privacy additional information is added to the audio signal, and a privacy setting transmission signal in which the normal additional information is added to the privacy additional information. The wireless receiver includes a reception unit that receives the normal transmission signal, the privacy transmission signal, and the privacy setting transmission signal. The normal communication mode is a mode in which the microphone transmits the normal transmission signal through the transmission unit, and the wireless receiver receives the normal transmission signal with the reception unit. The privacy setting mode is a mode in which the microphone transmits the privacy setting transmission signal through the transmission unit, and the wireless receiver receives the privacy setting transmission signal with the reception unit. The privacy communication mode is a mode in which the microphone transmits the privacy transmission signal through the transmission unit, and the wireless receiver receives the privacy transmission signal with the reception unit.

In this configuration, the normal transmission signal, the privacy transmission signal, and the privacy setting transmission signal are not transmitted by different transmission units and are transmitted from the same transmission unit. This simplifies the configuration of the microphone. Furthermore, prevention of eavesdropping by a third party is further ensured.

Preferably, in the privacy setting mode, the microphone transmits the privacy setting transmission signal throughout a set time after the privacy setting mode starts and saves the privacy additional information contained in the privacy setting transmission signal. In the privacy communication mode, the microphone forms the privacy transmission signal using the saved privacy additional information and transmits the privacy transmission signal. In the privacy setting mode, the wireless receiver saves the privacy additional information contained in the privacy setting transmission signal when receiving the privacy setting transmission signal from the microphone. In the privacy communication mode, the wireless receiver processes the privacy transmission signal using the saved privacy additional information.

In this configuration, the wireless receiver saves the privacy additional information when receiving the privacy setting transmission signal while the microphone is transmitting the privacy setting transmission signal. In other words, if the privacy setting transmission signal from the microphone is not received, the wireless receiver does not save the privacy additional information even if in the privacy setting mode. This suppresses the saving of an erroneous signal as the privacy additional information. Thus, eavesdropping by a third party is prevented in a further ensured manner.

Preferably, the microphone randomly forms the privacy additional information whenever the privacy setting mode is set, and forms the privacy setting transmission signal and the privacy transmission signal using the formed privacy additional information. Whenever successfully receiving the privacy additional information while set in the privacy setting mode, the wireless receiver updates the saved privacy additional information with the newly received privacy additional information, and processes the privacy setting transmission signal and the privacy transmission signal using the updated privacy additional information.

In this configuration, the microphone randomly forms the privacy additional information whenever it is set to the privacy setting mode, so that it becomes difficult for a third party to predict the privacy additional information. Thus, eavesdropping by a third party is further suppressed.

Preferably, the microphone stores multiple pieces of privacy additional information, randomly selects one of the pieces of privacy additional information whenever the privacy setting mode is set, and forms the privacy setting transmission signal and the privacy transmission signal using the selected privacy additional information. Whenever successfully receiving the privacy additional information while set in the privacy setting mode, the wireless receiver updates the saved privacy additional information with the newly received privacy additional information, and processes the privacy setting transmission signal and the privacy transmission signal using the updated privacy additional information.

In this configuration, the microphone randomly selects one of the pieces of stored privacy additional information whenever set to the privacy setting mode, so that it becomes difficult for a third party to predict the privacy additional information. Thus, eavesdropping by a third party is further suppressed.

Preferably, the microphone and the wireless receiver each include an operation unit through which the privacy setting mode is set. The microphone and the wireless receiver are each set in the privacy setting mode in correspondence with operation through the corresponding operation unit. In the privacy setting mode, the wireless receiver receives the privacy setting transmission signal only when the operation unit of the wireless receiver is continuously operated.

In this configuration, the wireless receiver receives the privacy setting transmission signal only when the operation unit of the wireless receiver is continuously operated. Thus, when the user interrupts the operation on the operation unit of the wireless receiver, reception of the privacy setting transmission signal can be stopped. Such an operation for shortening the reception period of the privacy setting transmission signal is performed in the following cases. For example, a third party may transmit dummy privacy additional information using another microphone to obstruct the privacy setting. In this case, the period for operating the operation unit of the wireless receiver is shortened to prevent such obstruction. This prevents eavesdropping by a third party is prevented.

Preferably, the additional information is a unique word for detecting the audio signal. The normal transmission signal is obtained by adding a normal unique word as the normal additional information to the audio signal. The privacy transmission signal is obtained by adding a privacy unique word as the additional information, which differs from the normal unique word, to the audio signal. The privacy setting transmission signal is obtained by adding the normal unique word to the privacy unique word.

In this configuration, in the privacy setting mode, the privacy unique word is transmitted from the microphone to the wireless receiver by transmitting the privacy transmission signal from the microphone. Further, communication is performed using the privacy unique word in the privacy communication mode. Thus, interception of the transmission signal from the microphone by the wireless receiver of a third party is suppressed with a simple configuration.

Preferably, the microphone encodes the audio signal with key information as the additional information to form an encoded audio signal, adds the key information to the encoded audio signal, and transmits the encoded audio signal. The normal transmission signal is obtained by adding normal key information as the normal additional information to the encoded audio signal. The privacy transmission signal is obtained by adding privacy key information as the additional information, which differs from the normal key information, to the encoded audio signal. The privacy setting transmission signal is obtained by adding the normal key information to the privacy key information.

In this configuration, in the privacy setting mode, the privacy key information is transmitted from the microphone to the wireless receiver by transmitting the privacy transmission signal from the microphone. Further, communication is performed using the privacy key information in the privacy communication mode. Since the audio signal is encoded, interception of the transmission signal from the microphone by the wireless receiver of a third party can be further suppressed with a simple configuration.

If the setting of the privacy setting mode is permitted after the termination of such privacy setting mode, the transmission signal including the privacy additional information can be continuously transmitted. When the third party uses the wireless receiver to intercept the privacy additional information and the third party waits with the wireless receiver in the reception state, if the transmission time of the transmission signal including the privacy additional information is prolonged, the possibility of the privacy additional information being intercepted would increase accordingly. Thus, in one example, execution of the privacy setting mode is prohibited from when the privacy setting mode of the microphone is terminated until when a transmission prohibiting period ends. In this configuration, opportunities for a third party eavesdropping on privacy additional information can be reduced.

If a third party uses the wireless receiver to intercept the privacy additional information, the third party would then perform an operation for executing the privacy setting mode immediately after the privacy setting mode of the wireless receiver is canceled, and wait with the wireless receiver maintained in the state of the privacy setting mode. Such an operation may result in interception of the privacy additional information. Thus, in one example, the execution of the privacy setting mode is prohibited from when the privacy setting mode of the wireless receiver is terminated until when a reception prohibiting period ends. In this configuration, it becomes difficult to continuously maintain the privacy setting mode. This suppresses eavesdropping of the privacy additional information.

Since the transmission signal from the microphone can be received if the wireless receiver is in the privacy setting mode when the microphone is in the privacy setting mode, the operation for setting the wireless receiver in the privacy setting mode is normally performed only once if the user is an authorized user. Thus, if the transmission signal from the microphone is not successively received, it can be assumed that the normal operation is not being performed. In other words, it is predicted that the possibility increases for a third party using the wireless receiver for eavesdropping. Thus, in one example, if the wireless receiver, which is in the privacy setting mode, successively fails to receive the transmission signal from the microphone a set number of times, an operation for setting the wireless receiver to a privacy setting mode is invalidated. In this configuration, it becomes difficult for a third party to continue using the wireless receiver. This suppresses interception of the transmission signal from the microphone.

When a third party intends to intercept the privacy additional information using the wireless receiver, the operations for setting the privacy setting mode may be continuously performed to maintain the wireless receiver in the state of the privacy setting mode. Thus, in one example, when operations for setting the wireless receiver to the privacy setting mode are performed for a set number of times within a set period, a subsequent operation for setting the wireless receiver to the privacy setting mode is invalidated. In this configuration, it becomes difficult to continuously perform the operations of setting to the privacy setting mode. This suppresses interception of the privacy additional information.

When a third party attempts to intercept the privacy additional information, the third party would carry out the eavesdropping at an area located farther than the distance from the microphone of an authorized user to the authorized wireless receiver. In other words, compared to when setting to the privacy setting mode by the normal operation, the reception level of the wireless receiver used for eavesdropping would be small. Thus, in one example, when the microphone is in the privacy setting mode, and a reception signal received by the wireless receiver is smaller than a reference reception level, the wireless receiver does not process the reception signal. In this configuration, it becomes difficult for a third party to intercept the privacy additional information using the wireless receiver.

Preferably, a radio wave intensity of when the microphone transmits a transmission signal in the privacy setting mode is set to be smaller than a radio wave intensity of when a transmission signal is transmitted in the normal communication mode.

In this configuration, the reaching distance of the transmission signal in the privacy setting mode becomes shorter than the reaching distance of the transmission signal in the normal communication mode. This makes it difficult for a third party to receive the transmission signal including the privacy unique word with the wireless receiver.

BRIEF DESCRIPTION OF THE DRAWINGS

FIGS. 4A, 4B, and 4C are schematic diagrams of a transmission signal transmitted by the microphone of the first embodiment.

FIG. 5 is a table showing the relationship of unique words of the microphone and the wireless receiver for a normal communication mode, a privacy setting mode, and a privacy communication mode of the first embodiment.

DETAILED DESCRIPTION OF THE INVENTION

First Embodiment

A first embodiment of the present invention will be described with reference to FIGS. 1 to 8.

Figure 1:
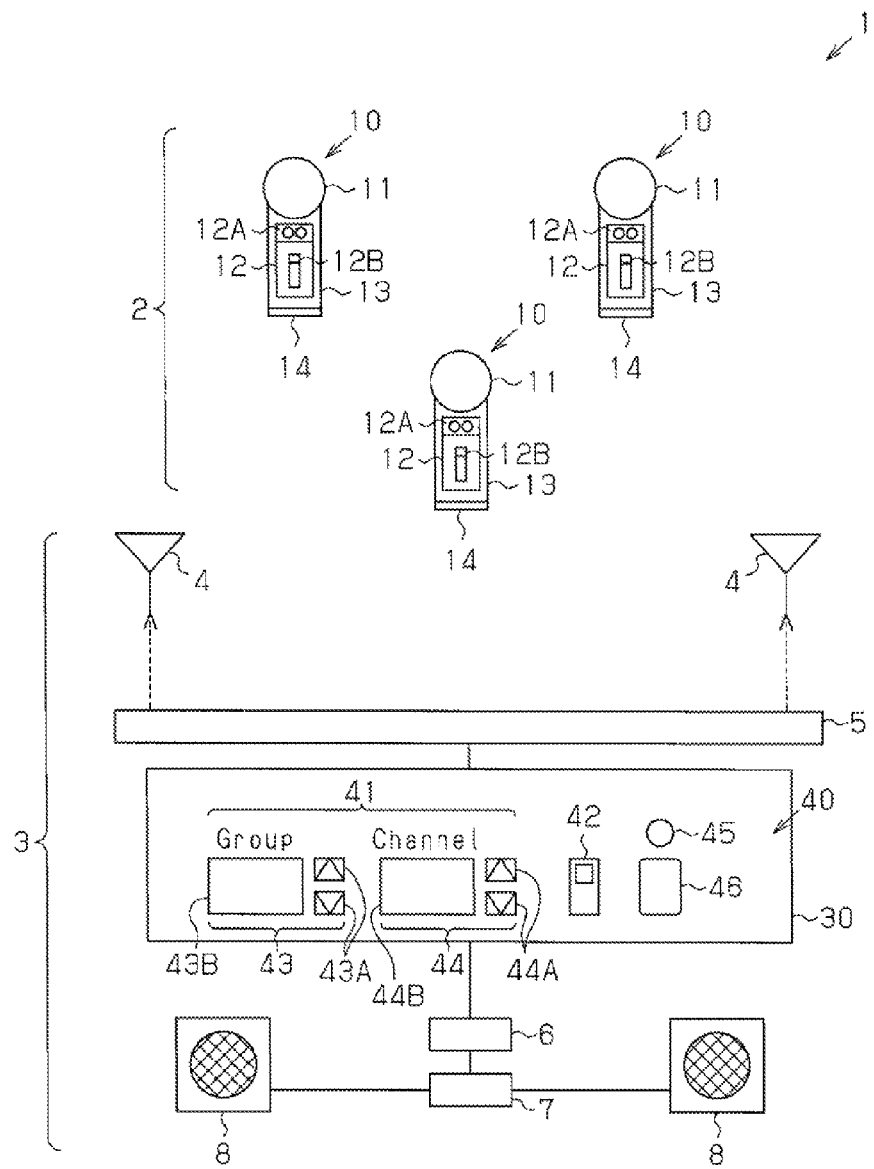
FIG. 1 is a schematic diagram of a wireless microphone system according to a first embodiment of the present invention.

As shown in FIG. 1, a wireless microphone system 1 includes a transmission system 2, which transmits a transmission signal SA, and a reception system 3, which receives the transmission signal SA.

The transmission system 2 includes one or more microphones 10. Each microphone 10 functions in a normal communication mode MDA, which transmits an audio signal through a normal method, a privacy communication mode MDC, which processes an audio signal into an audio signal that resists reproduction by a third party and transmits the processed audio signal, and a privacy setting mode MDB, which performs setting allowing for execution of communication in the privacy communication mode MDC.

The reception system 3 includes wireless antennas 4 that receives the transmission signal SA from the microphone 10, a mixing unit 5 that mixes the signals from the antenna 4, a wireless receiver 30 that demodulates the signal from the mixing unit 5, a mixer 6 that mixes the signals from the wireless receiver 30, an amplifier 7 that amplifies the signal from the mixer 6, and a speaker 8 that reproduces the amplified signal. The wireless receiver 30 functions in the normal communication mode MDA, the privacy communication mode MDC, and the privacy setting mode MDB, which correspond to the modes of the microphone 10.

The microphone 10 and the reception system 3 have multiple channels. The channel configuration of the transmission system 2 conforms to the channel configuration of the reception system 3, and the channels of the transmission system 2 correspond one-to-one to the channels of the reception system 3. In order to receive the transmission signal SA of the microphone 10 with the reception system 3, both systems are set to use the same channel. When using a plurality of microphones 10, a plurality of channels is simultaneously used.

The microphone 10 includes a head unit 11 that detects sound and voice, an operation unit 12 through which various settings are performed, a signal processing unit 13 that forms a transmission signal based on the signal from the head unit 11 and the set channel, and a transmission unit 14 that transmits the transmission signal SA formed by the signal processing unit 13. The transmission signal SA includes an audio digital signal SD (audio signal) and a unique word UW, which is used by the wireless receiver 30 to identify the location of the audio digital signal SD.

The operation unit 12 includes a transmission channel setting portion 12A for setting a transmission channel CHX, and a switch 12B for switching modes (normal communication mode MDA, privacy communication mode MDC, privacy setting mode MDB).

Figure 2:
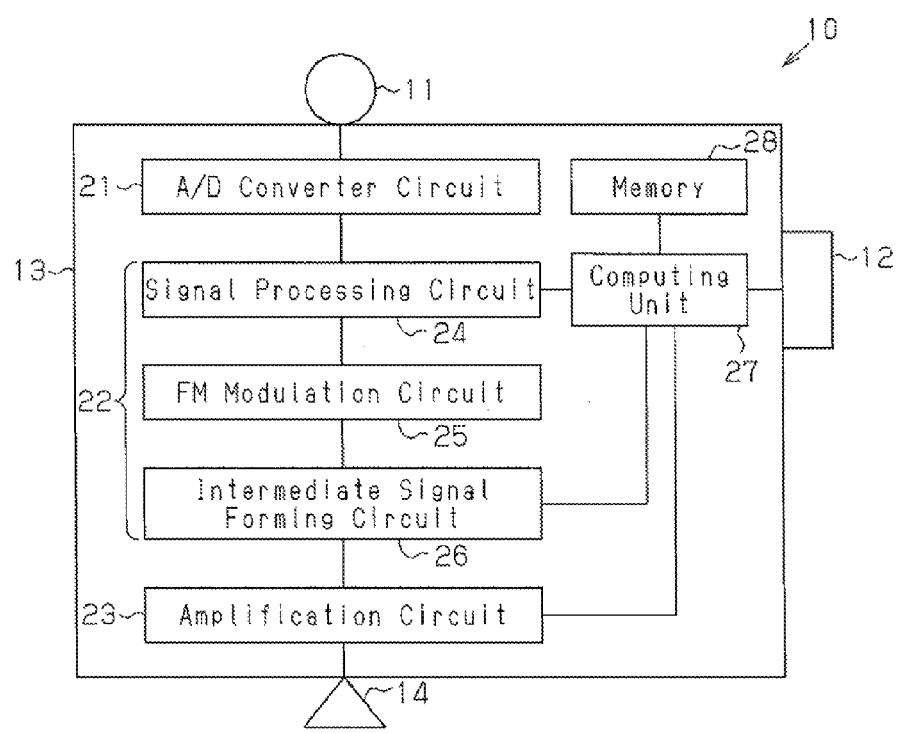
FIG. 2 is a block diagram of the microphone of the first embodiment.

As shown in FIG. 2, the signal processing unit 13 includes an A/D converter circuit 21 that converts the signal from the head unit 11 to a digital signal, a signal generator 22 that generates an intermediate transmission signal SC based on the digital signal formed by the A/D converter circuit 21, and an amplification circuit 23 that amplifies the intermediate transmission signal SC to form the transmission signal SA. Furthermore, the signal processing unit 13 includes a computing unit 27, which forms the unique word UW, and a memory 28 that stores the unique word UW. The memory 28 stores a unique word used in the normal communication mode MDA (hereinafter referred to as normal unique word UWN). The computing unit 27 and the memory 28 form an example of a microphone control unit for controlling the operation of the microphone 10.

The signal generator 22 includes a signal processing circuit 24 that converts the signal of the A/D converter circuit 21 to a signal complying with a predetermined standard and adds the unique word UW to the converted signal, an FM modulation circuit 25 that FM modulates the signal of the signal processing circuit 24, and an intermediate signal forming circuit 26 that forms the intermediate transmission signal SC based on the FM modulated signal and a carrier frequency.

The intermediate signal forming circuit 26 includes a PLL circuit (phase locked loop circuit). The PLL circuit forms a stable intermediate transmission signal SC based on the signal modulated by the FM modulation circuit 25 and the carrier frequency. The frequency corresponding to the transmission channel CHX set through the operation unit 12 is used for the carrier frequency. The carrier frequency is changed by changing the setting of the transmission channel CHX.

When the mode is switched, the computing unit 27 provides the unique word UW corresponding to the switched mode to the signal processing circuit 24. Thus, the signal processing circuit 24 forms a signal in a format corresponding to the switched mode. Furthermore, in the privacy setting mode MDB, the computing unit 27 creates a random number to form a unique word (hereinafter referred to as privacy unique word UWX), and saves the privacy unique word UWX in the memory 28. In the privacy setting mode MDB, the computing unit 27 sets the gain of the amplification circuit 23 to a value lower than the gain in the normal communication mode MDA. Thus, the computing unit 27 sets the radio wave intensity in the privacy setting mode MDB to be smaller than the radio wave intensity in the normal communication mode MDA.

The wireless receiver 30 will now be described with reference to FIG. 3.

The wireless receiver 30 includes an operation unit 40 through which a reception channel CHY is set, and a reception unit 50, which is arranged in correspondence with the reception channel CHY. The wireless receiver 30 is configured by combining a plurality of receiving units.

The operation unit 40 is arranged on a front surface of a main body of the wireless receiver 30 (see FIG. 1). The operation unit 40 includes a reception channel setting portion 41 for setting the reception channel CHY, a switch 42 for switching between the normal communication mode MDA, the privacy communication mode MDC, and the privacy setting mode MDB, a display portion 45 that displays the reception result, and a receive button 46 for setting the reception unit 50 in the reception state during the privacy setting mode MDB.

The reception channel setting portion 41 includes a first reception setting portion 43 for setting a reception group GR, and a second reception setting portion 44 for setting a specific reception channel CHY in the group. The first reception setting portion 43 includes a first selection button 43A for selecting the reception group GR and a group display portion 43B for displaying the selected reception group GR. The second reception setting portion 44 includes a second selection button 44A for selecting the reception channel CHY, and a channel display portion 44B, which displays the selected reception channel CHY.

Figure 3:
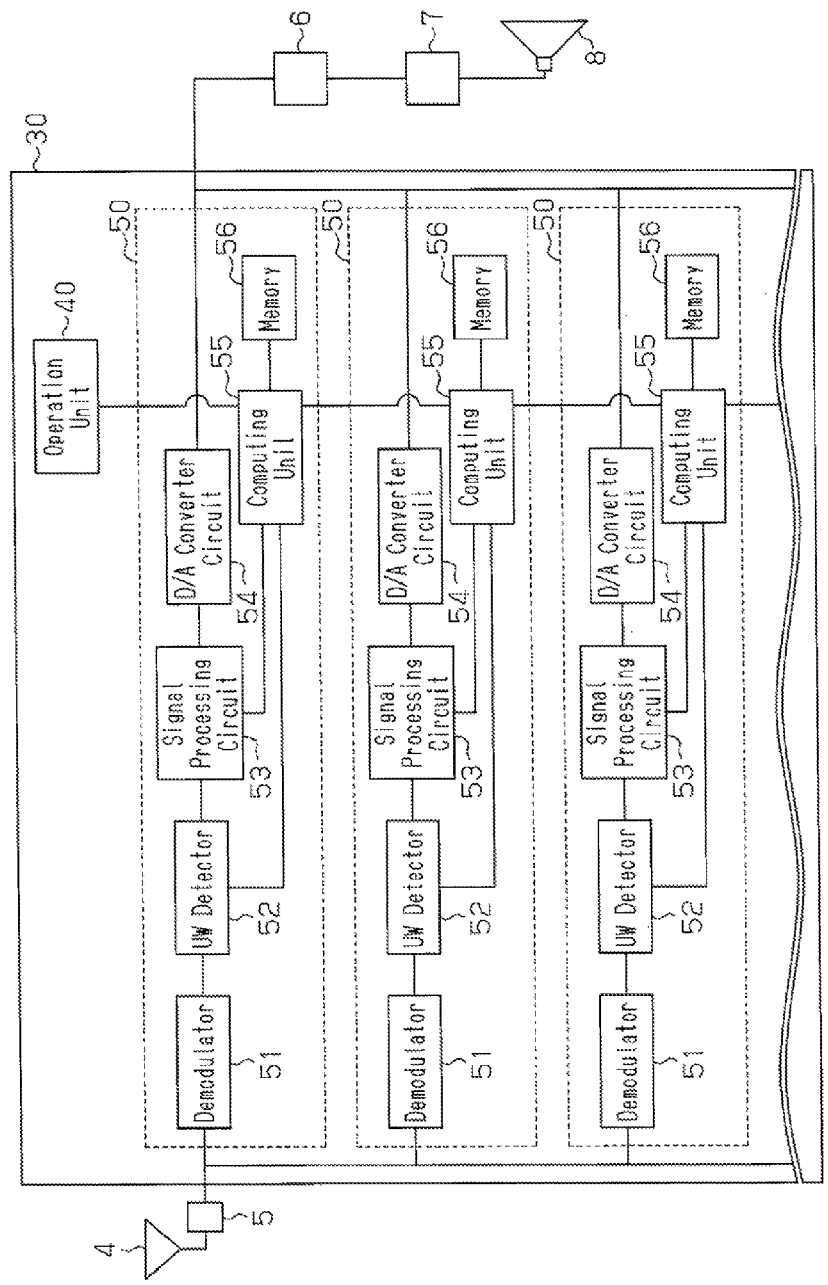
FIG. 3 is a block diagram of a wireless receiver of the first embodiment.

As shown in FIG. 3, the reception unit 50 includes a demodulator 51 that demodulates the signal from the mixing unit 5, a UW detector 52 that detects the unique word UW in the demodulated signal SB from the demodulator 51, a signal processing circuit 53 that processes the demodulated signal SB and extracts the audio digital signal SD, and a D/A converter circuit 54 that converts the audio digital signal SD to the analog signal. Furthermore, the reception unit 50 includes a computing unit 55, which outputs a command to the signal processing circuit 53 based on the operation through the operation unit 40, and a memory 56, which stores the signal from the computing unit 55. The memory 56 stores the normal unique word UWN used in the normal communication mode MDA. The computing unit 55 and the memory 56 serve as a receiver control unit that controls the operation of the wireless receiver 30.

The calculator 55 executes the following controls in accordance with the modes.

In the normal communication mode MDA, the computing unit 55 reads the normal unique word UWN corresponding to the normal communication mode MDA from the memory 56, and provides the normal unique word UWN to the signal processing circuit 53.

When the wireless receiver 30 is in the privacy setting mode MDB, the computing unit 55 extracts the privacy unique word UWX from the received transmission signal SA, and saves the privacy unique word UWX in the memory 56. When set to the privacy communication mode MDC, the computing unit 55 provides the privacy unique word UWX to the signal processing circuit 53.

If the signal (reception signal) from the mixing unit 5 is smaller than a reference reception level when the wireless receiver 30 is set to the privacy communication mode MDC, the computing unit 55 prohibits processing of the signal.

The signal processing circuit 53 compares the unique word UW detected by the UW detector 52 and the unique word UW provided from the computing unit 55, and detects the degree of conformance. If the conformance degree is greater than a predetermined value, the signal processing circuit 53 assumes that the two unique words are in conformance, and extracts the audio digital signal SD from the demodulated signal SB. If the conformance degree is less than or equal to the predetermined value, the signal processing circuit 53 assumes that the unique words are not in conformance. Thus, the signal processing circuit 53 does not extract the audio digital signal SD from the demodulated signal SB and does not reproduce the audio digital signal SD.

The display portion 45 displays that the transmission signal SA (hereinafter referred to as privacy setting transmission signal SAX) containing the privacy unique word UWX is not received in the privacy setting mode MDB. For example, the display portion 45 flashes in red if the privacy setting transmission signal SAX is not received, and the display portion 45 flashes in blue if the privacy setting transmission signal SAX is received.

The transmission signal SA of each mode will be described with reference to FIG. 4.

As shown in FIG. 4A, the transmission signal corresponding to the normal communication mode MDA (normal transmission signal SAU) contains the normal unique word UWN and the audio digital signal SD. In other words, the normal transmission signal SAU is received by the wireless receiver 30 when the wireless receiver 30 is set in the normal communication mode MDA.

As shown in FIG. 4B, the transmission signal SA corresponding to the privacy setting mode MDB, namely, the privacy setting transmission signal SAX, contains the normal unique word UWN and the privacy unique word UWX. In other words, the privacy setting transmission signal SAX is used as a signal for transmitting the privacy unique word UWX to the wireless receiver 30 from the microphone 10.

As shown in FIG. 4C, the transmission signal SA corresponding to the privacy communication mode MDC (privacy transmission signal SAY) contains the privacy unique word UWX and the audio digital signal SD. In other words, the privacy transmission signal SAY is not received by the wireless receiver 30 if the privacy unique word UWX is not set in the wireless receiver 30.

Communication examples for each mode will now be described with reference to FIG. 5.

(A) When using the wireless microphone system 1 in the normal manner, the microphone 10 and the wireless receiver 30 are set to the normal communication mode MDA. In this case, the common normal unique word UWN is set in the microphone 10 and the wireless receiver 30. Thus, the transmission signal SA from the microphone 10 is received by the wireless receiver 30. In other words, the wireless receiver 30 can extract the audio signal from the transmission signal SA based on the normal unique word UWN. In each of the microphones 10 and the wireless receiver 30, the normal unique word UWN is set as a default of the unique word UW.

(B) When using the microphone system 1 in the privacy communication mode MDC in case a third party may be eavesdropping on the transmission signal SA of the microphone 10, the user performs the following setting operation before switching to the privacy communication mode MDC. The user switches the microphone 10 and the wireless receiver 30 to the privacy setting mode MDB. When starting this setting operation, the normal unique word UWN is set in the microphone 10 and the wireless receiver 30. That is, the transmission signal SA from the microphone 10 can be received by the wireless receiver 30. When the microphone 10 transmits the privacy setting transmission signal SAX, the privacy unique word UWX can be transmitted to the wireless receiver 30.

(C) When using the wireless microphone system 1 in the privacy communication mode MDC in case a third party may be eavesdropping on the transmission signal SA of the microphone 10, the user sets the microphone 10 and the wireless receiver 30 to the privacy communication mode MDC after switching to the privacy setting mode MDB. If the transmission of the privacy unique word UWX to the wireless receiver 30 was successful, the common privacy unique word UWX is set in the microphone 10 and the wireless receiver 30. The transmission signal SA from the microphone 10 can thus be received by the wireless receiver 30, and the wireless receiver 30 can extract the audio signal from the transmission signal SA based on the privacy unique word UWX.

(D) When the unique word UW of the microphone 10 is set to the privacy unique word UWX, and the unique word UW of the wireless receiver 30 is set to the normal unique word UWN, the following result is obtained. Since the unique words UW are not in conformance, the wireless receiver 30 cannot extract the audio digital signal SD from the transmission signal SA generated by the microphone 10. Further, the transmission signal SA cannot be reproduced, and the audio cannot be output.

Figure 6:
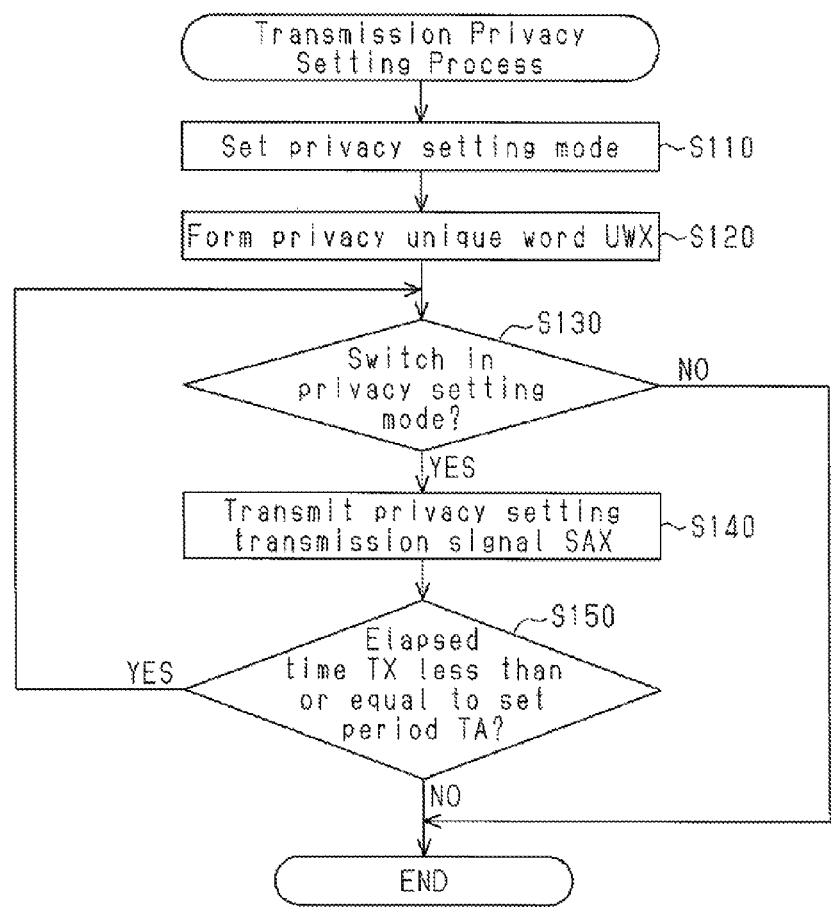
FIG. 6 is a flowchart of a transmission privacy setting process executed in the wireless receiver of the first embodiment.

A transmission privacy setting process executed by the microphone 10 (specifically, microphone control unit) will now be described with reference to FIG. 6.

When the switch 12B of the operation unit 12 is switched to the privacy setting mode MDB, in step S110, the microphone 10 is set to the privacy setting mode MDB. In this case, in step S120, the computing unit 27 creates a random number and forms the privacy unique word UWX based on the random number. In step S130, it is determined whether or not the privacy setting mode MDB is being maintained. When an affirmative determination is made, in step S140, the privacy setting transmission signal SAX is transmitted from the microphone 10 and the privacy unique word UWX is saved in the memory 28. The privacy unique word UWX saved in the memory 28 is updated with the privacy unique word UWX that is newly formed whenever the transmission privacy setting process is executed.

In step S150, it is determined whether or not an elapsed time TX from when the transmission of the privacy setting transmission signal SAX started is less than or equal to a set period TA (transmission set period). When an affirmative determination is made, the transmission of the privacy setting transmission signal SAX is maintained. If a negative determination is made in step S150, that is, if determined that the elapsed time TX is greater than the set period TA, the transmission privacy setting process is terminated. The transmission privacy setting process is also terminated when determined that the switch 12B is not in the privacy setting mode MDB in step S130.

Figure 7:
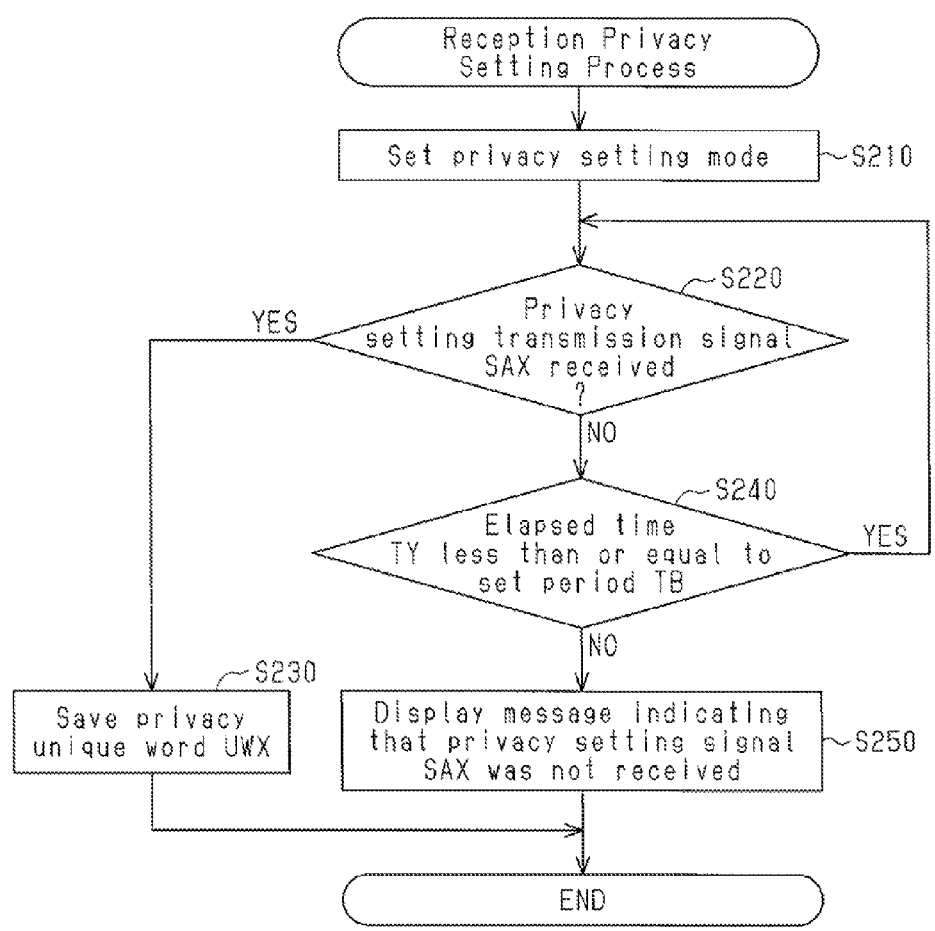
FIG. 7 is a flowchart of a reception privacy setting process executed in the wireless receiver of the first embodiment.

A reception privacy setting process executed by the wireless receiver 30 (specifically, receiver control unit) will now be described with reference to FIG. 7.

In step S210, when the switch 42 of the operation unit 40 is switched to the privacy setting mode MDB and the receive button 46 is pushed, the wireless receiver 30 is set to the privacy setting mode MDB. In step S220, it is determined whether or not the privacy setting transmission signal SAX is received. In step S230, if an affirmative determination is made, the computing unit 55 extracts the privacy unique word UWX from the privacy setting transmission signal SAX and saves the privacy unique word UWX in the memory 56. The privacy unique word UWX saved in the memory 56 is updated with the received privacy unique word UWX whenever the reception of the privacy setting transmission signal SAX is successful in the execution of the reception privacy setting process. It is determined whether or not the reception of the privacy setting transmission signal SAX is successful based on, for example, whether or not a signal intensity of the privacy setting transmission signal SAX is greater than or equal to a threshold level. If the signal intensity of the privacy setting transmission signal SAX is smaller than the threshold level during the execution of the reception privacy setting process, the updating of the privacy unique word UWX is not executed.

If a negative determination is made in step S220, that is, if determined that the privacy setting transmission signal SAX is not received, in step S240, it is determined whether or not an elapsed time TY from when the switch 42 is switched to the privacy setting mode MDB is less than or equal to a set period TB (reception set period). If an affirmative determination is made in step S240, that is, if the elapsed time TY is less than or equal to the set period TB, the reception state of receiving the privacy setting transmission signal SAX is maintained. If a negative determination is made in step S240, that is, if the elapsed time TY is greater than the set period TA, in step S250, a message indicating that the privacy setting transmission signal SAX was not received is displayed on the display portion 45.

Figure 8:
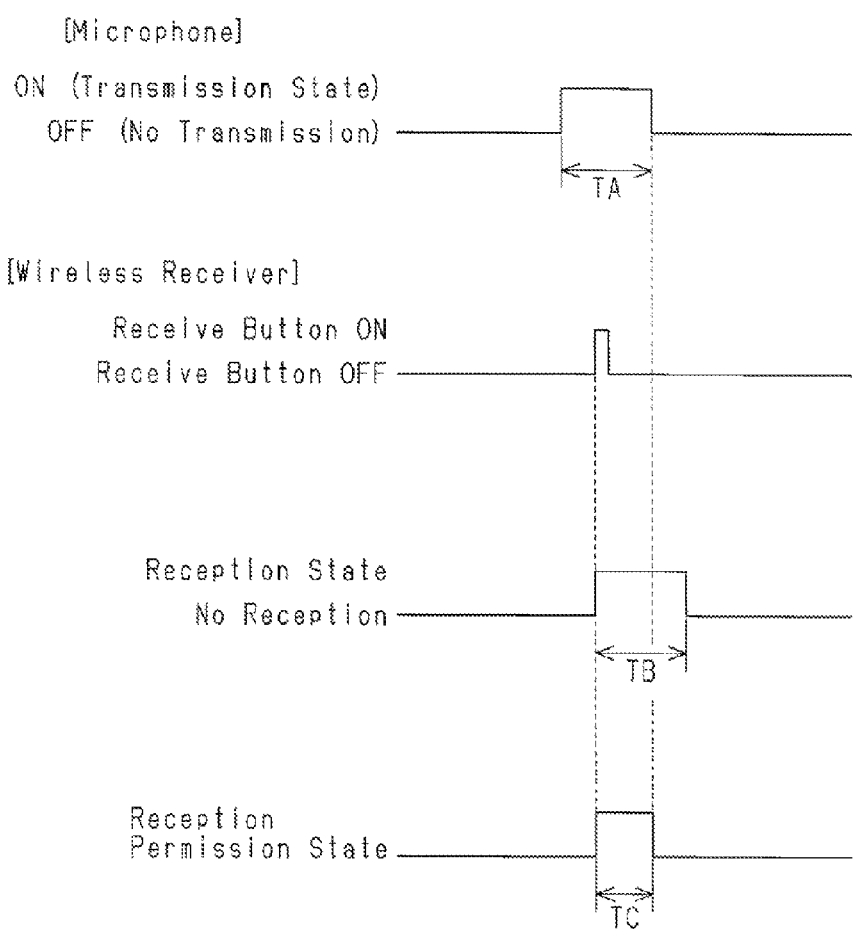
FIG. 8 is a timing chart showing the relationship of a transmission state of the microphone and a reception state of the wireless receiver of the first embodiment.

A receivable period TC in which the wireless receiver 30 in the privacy setting mode MDB can receive the privacy setting transmission signal SAX will now be described with reference to FIG. 8.

When the switch 12B is switched to the privacy setting mode MDB, the microphone 10 transmits the privacy setting transmission signal SAX throughout the set period TA. In contrast, when the switch 42 is switched to the privacy setting mode MDB and the receive button 46 is pushed, the wireless receiver 30 is in a reception state capable of receiving the privacy setting transmission signal SAX throughout the set period TB. When the wireless receiver 30 receives the privacy setting transmission signal SAX in the reception state, the wireless receiver 30 extracts the privacy unique word UWX from the privacy setting transmission signal SAX and saves the privacy unique word UWX in the memory 56.

Accordingly, the receivable period TC in which the wireless receiver 30 can substantially receive the privacy setting transmission signal SAX is limited to a period overlapped with the period for which the privacy setting transmission signal SAX is transmitted and the period for which the wireless receiver 30 is in the reception state.

The present embodiment has the advantages described below.

(1) In the present embodiment, the wireless microphone system 1 functions in the normal communication mode MDA, the privacy setting mode MDB, and the privacy communication mode MDC. In the normal communication mode MDA, the microphone 10 and the wireless receiver 30 communicate with each other using the normal unique word UWN (normal additional information) serving as additional information, which is set in advance in the microphone 10 and the wireless receiver 30. In the privacy setting mode MDB, the microphone 10 sets the privacy unique word UWX (privacy additional information), which differs from the normal unique word UWN, to the microphone 10, and the microphone 10 transmits the privacy unique word UWX to the wireless receiver 30. In the privacy communication mode MDC, the microphone 10 and the wireless receiver 30 communicate using the privacy unique word UWX serving as the additional information, which is set in the microphone 10 and the wireless receiver 30 by the privacy setting mode MDB.

In this configuration, the microphone 10 transmits the privacy unique word UWX to the wireless receiver 30 in the privacy setting mode MDB, and the microphone 10 and the wireless receiver 30 communicate based on the privacy unique word UWX in the privacy communication mode MDC. The communication in the privacy communication mode MDC uses the privacy unique word UWX, which differs from the normal unique word UWX used in the normal communication mode MDA. This suppresses eavesdropping of the transmission signal SA from the microphone 10 by a wireless receiver of a third party. Further, the configuration is simplified since an encryption key is not exchanged between the microphone 10 and the wireless receiver 30 like in the technique for encrypting audio signals.

(2) In the present embodiment, the microphone 10 includes the transmission unit 14 for transmitting the normal transmission signal SAU, in which the normal unique word UWN is added to the audio signal, the privacy transmission signal SAY, in which the privacy unique word UWX is added to the audio signal, and the privacy setting transmission signal SAX, in which the normal unique word UWN is added to the privacy unique word UWX. The wireless receiver 30 includes the reception unit 50 for receiving the normal transmission signal SAU, the privacy transmission signal SAY, and the privacy setting transmission signal SAX.

In the normal communication mode MDA, the microphone 10 transmits the normal transmission signal SAU from the transmission unit 14, and the wireless receiver 30 receives the normal transmission signal SAU with the reception unit 50. In the privacy setting mode MDB, the microphone 10 transmits the privacy setting transmission signal SAX, and the wireless receiver 30 receives the privacy setting transmission signal SAX with the reception unit 50. In the privacy communication mode MDC, the microphone 10 transmits the privacy transmission signal SAY from the transmission unit 14, and the wireless receiver 30 receives the privacy transmission signal SAY with the reception unit 50.

In this configuration, the normal transmission signal SAU, the privacy transmission signal SAY, and the privacy setting transmission signal SAX are not transmitted by different transmission units 14 but are transmitted from the same transmission unit 14. This simplifies the configuration of the microphone 10.

(3) In the present embodiment, during the privacy setting mode MDB, the microphone 10 transmits the privacy setting transmission signal SAX throughout the set time after the privacy setting mode MDB starts, and saves the privacy unique word UWX contained in the privacy setting transmission signal SAX. In the privacy communication mode MDC, the microphone 10 forms the privacy transmission signal SAY using the saved privacy unique word UWX, and transmits the privacy transmission signal SAY.

In the privacy setting mode MDB, the wireless receiver 30 saves the privacy unique word UWX contained in the privacy setting transmission signal SAX when receiving the privacy setting transmission signal SAX from the microphone 10. In the privacy communication mode MDC, the wireless receiver 30 processes the privacy transmission signal SAY using the saved privacy unique word UWX.

In this configuration, the wireless receiver 30 saves the privacy unique word UWX when receiving the privacy setting transmission signal SAX while the microphone 10 is transmitting the privacy setting transmission signal SAX. In other words, if the privacy setting transmission signal SAX from the microphone 10 is not received, the privacy unique word UWX is not saved in the wireless receiver 30 even if the wireless receiver 30 is in the privacy setting mode MDB. This suppresses an erroneous signal from being saved in the wireless receiver 30 as the privacy unique word UWX.

(4) In the present embodiment, the microphone 10 randomly generates the privacy additional information whenever set to the privacy setting mode MDB, and forms the privacy setting transmission signal SAX and the privacy transmission signal SAY using the formed privacy unique word UWX. When set to the privacy setting mode MDB, the wireless receiver 30 updates the saved privacy unique word UWX with the newly received privacy unique word UWX whenever the reception of the privacy unique word UWX is successful. The microphone 10 processes the privacy setting transmission signal SAX and the privacy transmission signal SAY using the updated privacy unique word UWX.

In this configuration, the microphone 10 randomly forms the privacy additional information whenever it is set to the privacy setting mode MDB, so that it becomes difficult for a third party to predict the privacy unique word UWX. This further suppresses eavesdropping by a third party.

(5) In the present embodiment, the unique word UW for detecting the audio signal is used as the additional information that distinguishes the normal communication mode MDA and the privacy communication mode MDC and allows for communication. The normal transmission signal SAU is obtained by adding the normal unique word UWN serving as normal additional information to the audio signal. The privacy transmission signal SAY is obtained by adding the privacy unique word UWX serving as the additional information different from the normal unique word UWN to the audio signal. The privacy setting transmission signal is obtained by adding the normal unique word UWN to the privacy unique word UWX.

In this configuration, in the privacy setting mode MDB, the privacy unique word UWX is transmitted from the microphone 10 to the wireless receiver 30 by transmitting the privacy transmission signal SAY from the microphone 10. In the privacy communication mode MDC, communication is performed using the privacy unique word UWX. Thus, a simple configuration suppresses eavesdropping of the transmission signal from the microphone 10 by the wireless receiver of a third party.

(6) In the present embodiment, the processing of the reception signal is not performed when the microphone 10 is in the privacy setting mode MDB and the reception signal received by the wireless receiver 30 is smaller than the reference reception level.

When a third party intercepts on the privacy unique word UWX (privacy additional information), the third party is likely to do so from a location farther than the distance from the microphone 10 of an authorized user to the authorized wireless receiver 30. In other words, compared to when set to the privacy setting mode MDB through a normal operation, the reception level of the wireless receiver 30 used for eavesdropping is considered to be small. In view of such a situation, the processing of the reception signal is not performed in the above-configuration if the reception signal received by the wireless receiver 30 is smaller than the reference reception level. This makes it difficult for the third party to intercept the privacy unique word UWX using the wireless receiver 30.

(7) In the present embodiment, the radio wave intensity at which the microphone 10 transmits the privacy setting transmission signal SAX in the privacy setting mode MDB is smaller than the radio wave intensity at which the microphone 10 transmits the normal transmission signal SAU in the normal communication mode MDA.

In this configuration, the reaching distance of the privacy setting transmission signal SAX including the privacy unique word UWX becomes shorter than the reaching distance of the normal transmission signal SAU including the normal unique word UWN. This makes it difficult for a third party to intercept the privacy unique word UWX with the wireless receiver 30.

Second Embodiment

Figure 9:
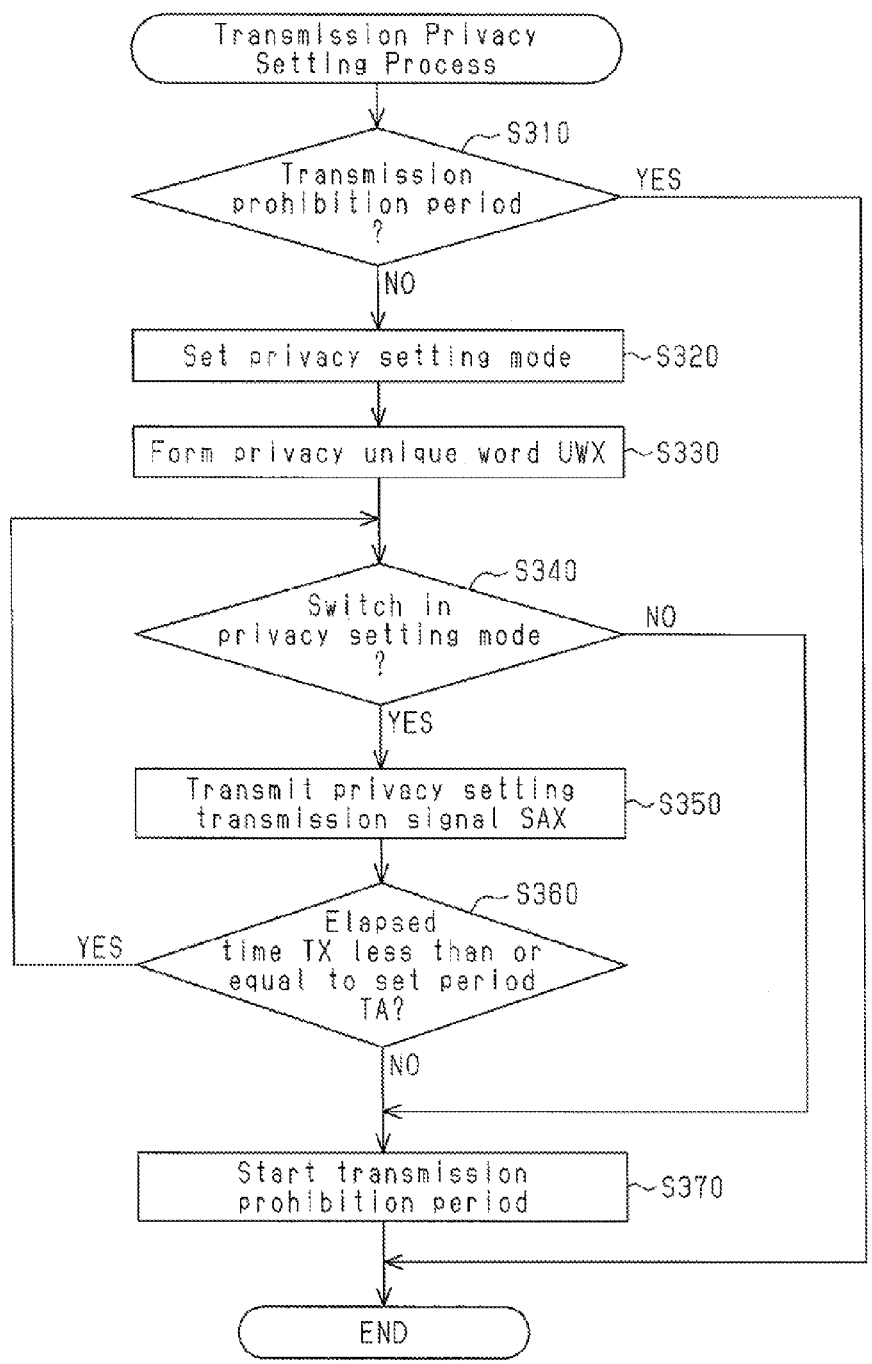
FIG. 9 is a flowchart of a transmission privacy setting process executed in a microphone of a second embodiment of the present invention.

A second embodiment of the present invention will now be described with reference to FIG. 9.

In the wireless microphone system 1 according to the present embodiment, the following changes are made to the configuration of the first embodiment. In the first embodiment, the transmission of the privacy setting transmission signal SAX is stopped after the elapsed time from when the switch 12B is switched to the privacy setting mode MDB in the microphone 10 reaches the set period TA. Immediately afterward, when retransmitting the privacy setting transmission signal SAX, retransmission can be performed by temporarily changing the switch 12B to the normal communication mode MDA, and then returning to the privacy setting mode MDB. In other words, the privacy setting mode MDB can be continuously repeated. However, if such operation is permitted, the possibility of receiving the privacy setting transmission signal SAX increases if a third party waits with the wireless receiver 30 in the privacy setting mode MDB. Accordingly, in the present embodiment, control is performed on the microphone 10 such that the privacy setting transmission signal SAX cannot be continuously transmitted. Hereinafter, the detailed changes from the configuration of the first embodiment that occur with such change will be described. Same reference numerals are given to those components that are the same as the corresponding components of the first embodiment. Such components will not be described.

When the switch 12B of the operation unit 12 is switched to the privacy setting mode MDB, in step S310, it is determined whether or not the transmission of the privacy setting transmission signal SAX is prohibited in the present period (hereinafter referred to as transmission prohibiting period TD). If an affirmative determination is made, the transmission privacy setting process is terminated.

If a negative determination is made in step S310, that is, when not in the transmission prohibiting period TD, step S320 to step S360 are processed. This series of steps are similar to the processing of step S110 to step S150 in the first embodiment, and the privacy setting transmission signal SAX is transmitted throughout the set period TA. If a negative determination is made in step S360, that is, if determined that the elapsed time TX is greater than the set period TA, or if a negative determination is made in step S340, that is, if not in the privacy setting mode MDB, the transmission prohibiting period TD is started. In this manner, unless the transmission prohibiting period TD ends, the transmission privacy setting process is not executed even if the operation of temporarily changing the switch 12B to the normal transmission mode MDA and then returning to the privacy setting mode MDB is performed.

The present embodiment has the advantages described below in addition to advantages (1) to (3), (5), and (9) of the first embodiment.

(6) In the present embodiment, the execution of the privacy setting mode MDB is prohibited from when the privacy setting mode MDB of the microphone 10 is terminated until the transmission prohibiting period TD ends.

If the setting of the privacy setting mode MDB is permitted after the termination of the privacy setting mode MDB, the privacy setting transmission signal SAX including the privacy unique word UWX (privacy additional information) may be continuously transmitted. If a third party were to use the wireless receiver 30 to intercept the privacy unique word UWX, the third party would wait with the wireless receiver 30 in the reception state. If the transmission time of the privacy unique word UWX is prolonged, the possibility the third party intercepting the privacy unique word UWX becomes higher accordingly. In the configuration described above, however, the privacy setting mode MDB is prohibited from being executed from when the privacy setting mode MDB is terminated until the transmission prohibiting period TD ends. This reduces the opportunities for a third party to intercept the privacy unique word UWX even if the third party is waiting with the wireless receiver 30 in the reception state for the purpose of eavesdropping.

Third Embodiment

Figure 10:
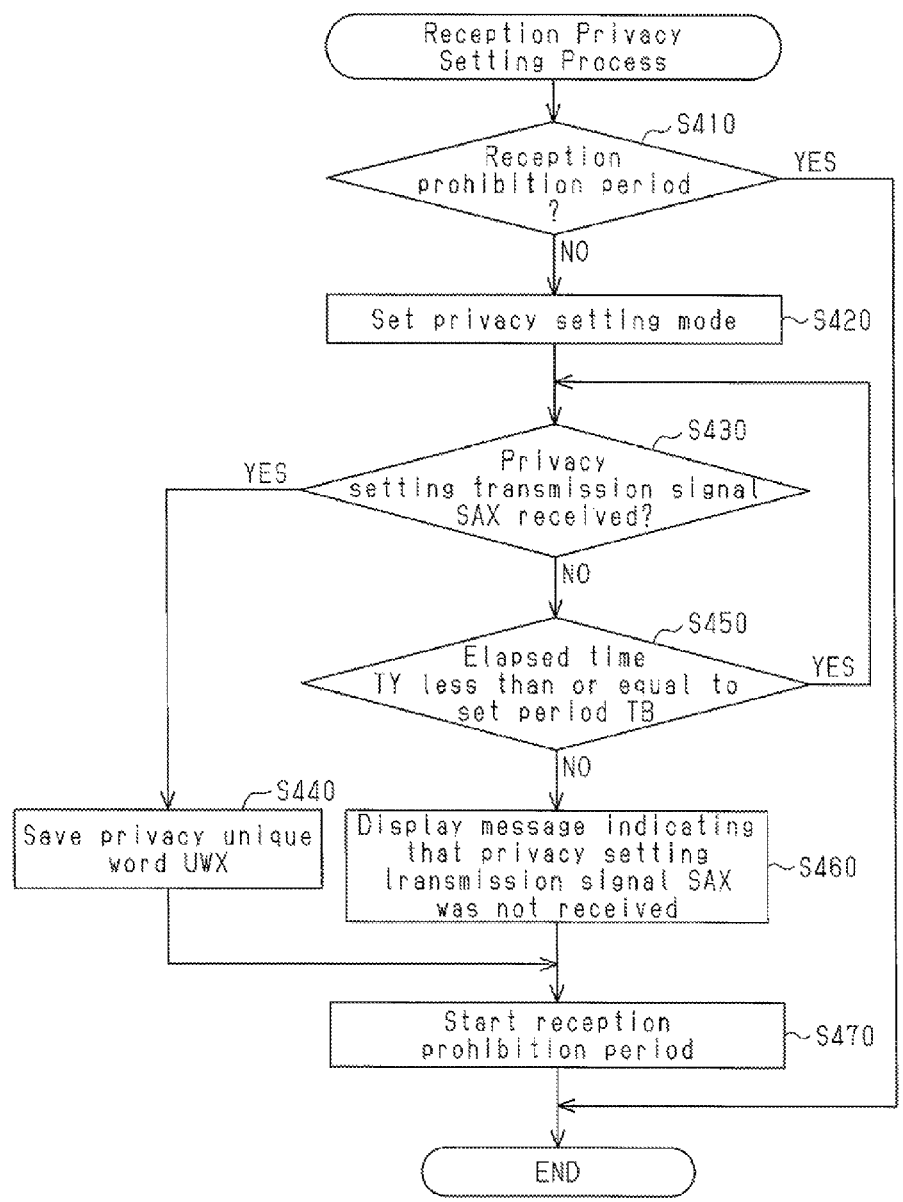
FIG. 10 is a flowchart of a reception privacy setting process executed in a wireless receiver of a third embodiment of the present invention.

A third embodiment of the present invention will now be described with reference to FIG. 10.

In the wireless microphone system 1 of the present embodiment, the following changes are made to the configuration of the first embodiment. In the first embodiment, the privacy setting mode MDB is set when the switch 42 is switched to the privacy setting mode MDB and the receive button 46 is pushed in the wireless receiver 30. The privacy setting mode MDB is terminated when the elapsed time from when the receive button 46 is pushed reaches the set period TA. When receiving the privacy setting transmission signal SAX again immediately afterward, the wireless receiver 30 may be set again in the reception state by pushing the receive button 46. In other words, the privacy setting mode MDB can be continuously repeated. However, if such an operation is permitted, when a third party maintains the wireless receiver 30 in the state of the privacy setting mode MDB to acquire the privacy unique word UWX transmitted from the microphone 10, the privacy unique word UWX may be acquired by the third party. Accordingly, in the present embodiment, the wireless receiver 30 is controlled so that the privacy setting transmission signal SAX cannot be continuously received. Hereinafter, changes from the configuration of the first embodiment will now be described in detail. Same reference numerals are given to those components that are the same as the corresponding components of the first embodiment. Such components will not be described.

When the switch 42 of the operation unit 40 is switched to the privacy setting mode MDB and the receive button 46 is pushed, in step S410, it is determined whether or not the reception of the privacy setting transmission signal SAX is prohibited in the present period (hereinafter referred to as reception prohibiting period TE). If an affirmative determination is made, the reception privacy setting process is terminated.

If a negative determination is made in step S410, that is, if not in the transmission prohibiting period TD, step S420 to step S460 are processed. This series of steps is similar to the processing of step S210 to step S250 in the first embodiment. That is, the reception processing of the privacy setting transmission signal SAX is performed. When a message that the privacy setting transmission signal SAX is not received is displayed on the display portion 45 in step S460, or when the privacy unique word UWX is saved in step S440, the reception prohibiting period TE is started in step S470. In other words, the reception privacy setting process is not executed even if the receive button 46 is pushed afterward until the reception prohibiting period TE ends.

The present embodiment has the advantages described below in addition to advantages (1) to (3), (5), and (9) of the first embodiment.

(7) In the present embodiment, the execution of the privacy setting mode MDB is prohibited from when the privacy setting mode MDB of the wireless receiver 30 is terminated until the reception prohibiting period TE ends.

A third party may use the wireless receiver 30 to intercept the privacy unique word UWX (privacy additional information). In this case, the third party would perform an operation for executing the setting mode MDB immediately after the privacy setting mode MDB of the wireless receiver 30 is canceled, and wait with the wireless receiver 30 maintained in the privacy setting mode MDB. In such an operation, the privacy unique word UWX may be intercepted. In this regards, in the configuration described above, the setting of the privacy setting mode MDB is prohibited from when the privacy setting mode MDB is terminated until the reception prohibiting period TE ends. Thus, it becomes difficult to continuously maintain the privacy setting mode MDB, and the privacy unique word UWX is suppressed from being intercepted.

Fourth Embodiment

Figure 11:
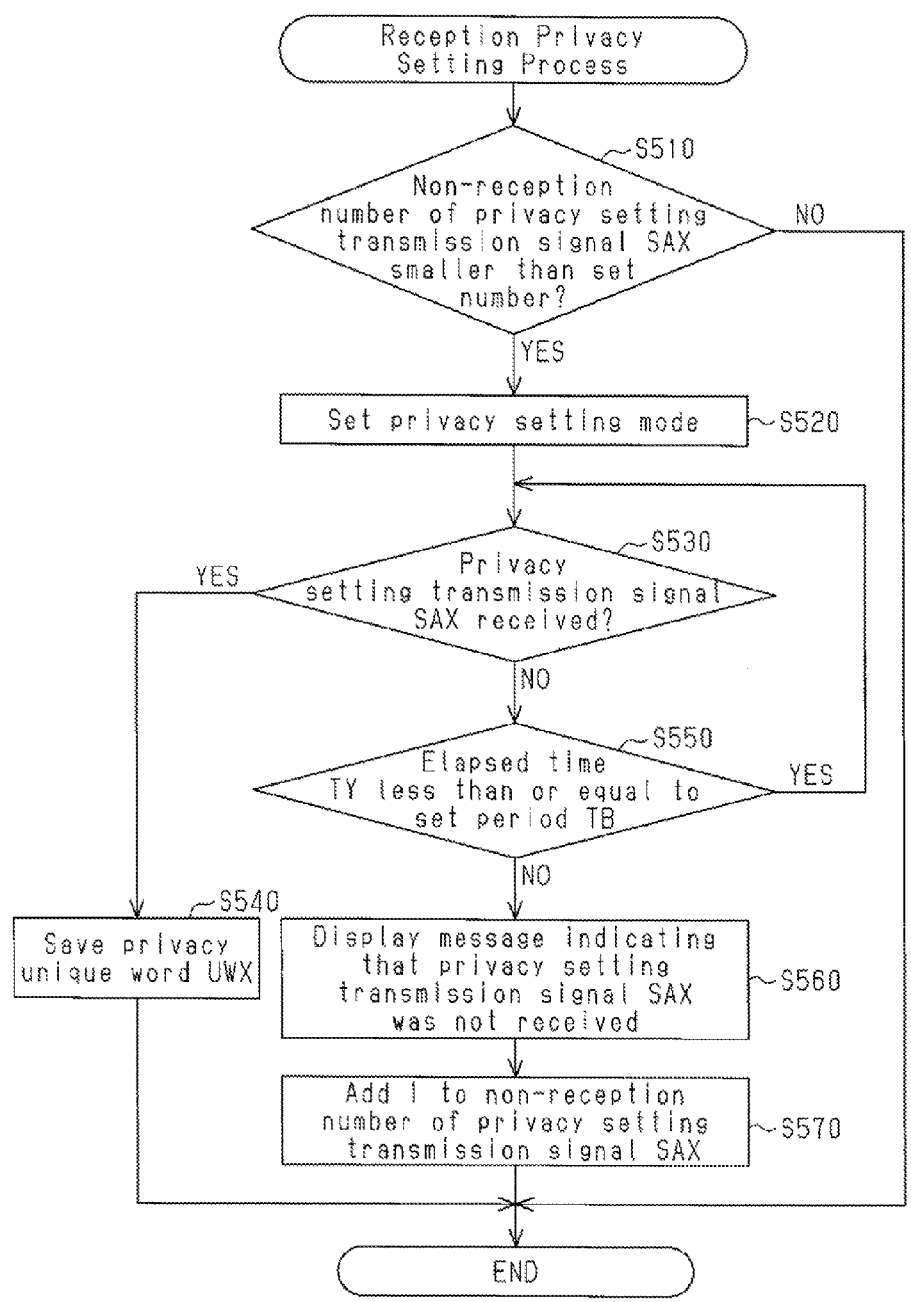
FIG. 11 is a flowchart of a reception privacy setting process executed in a wireless receiver of a fourth embodiment of the present invention.

A fourth embodiment of the present invention will now be described with reference to FIG. 11 and FIG. 12.

In the wireless microphone system 1 of the present embodiment, the following changes are added to the configuration of the first embodiment. In other words, in the first embodiment, the privacy setting mode MDB is set when the switch 42 is switched to the privacy setting mode MDB and the receive button 46 is pushed in the wireless receiver 30. The privacy setting mode MDB is terminated after the set period TA from when the receive button 46 is pushed. If reception of the privacy setting transmission signal SAX fails, the wireless receiver 30 is set again in the reception state by pushing the receive button 46. However, if such an operation is permitted without any restrictions, the possibility of a third party acquiring the privacy setting transmission signal SAX increases when the third party repeats the setting of the wireless receiver 30 to the privacy setting mode MDB to acquire the privacy unique word UWX transmitted from the microphone 10. Accordingly, in the present embodiment, when a failure (non-reception) of the reception of the privacy setting transmission signal SAX is repeated for a predetermined number of times or greater, the privacy setting mode MDB is controlled so that it cannot be set thereafter. The changes from the configuration of the first embodiment will now be described in detail. Same reference numerals are given to those components that are the same as the corresponding components of the first embodiment. Such components will not be described in detail.

When the switch 42 of the operation unit 40 is switched to the privacy setting mode MDB and the receive button 46 is pushed, in step S510, it is determined whether or not a number of times the privacy setting transmission signal SAX is not received prior to processing (hereinafter referred to as non-reception number KX) is less than a set number KA. If a negative determination is made, the reception privacy setting process is terminated. The number of times the privacy setting transmission signal SAX is not received is counted in the process of step S570, which will be described later.

If an affirmative determination is made in step S510, that is, if the non-reception number KX is smaller than the set number KA, step S520 to step S560 are processed. This series of steps is similar to the processing of step S210 to step S250 in the first embodiment. When processing a message indicating that the privacy setting transmission signal SAX was not received for display on the display portion 45 in step S560, the non-reception number KX is incremented by one.

The frequency at which a receivable period TC is formed will now be described with reference to FIGS. 12A and 12B, by comparing a case in which the setting of the privacy setting mode MDB is not prohibited based on the non-reception number KX and a case in which the setting of the privacy setting mode MDB is prohibited based on the non-reception number KX.

Figure 12A:
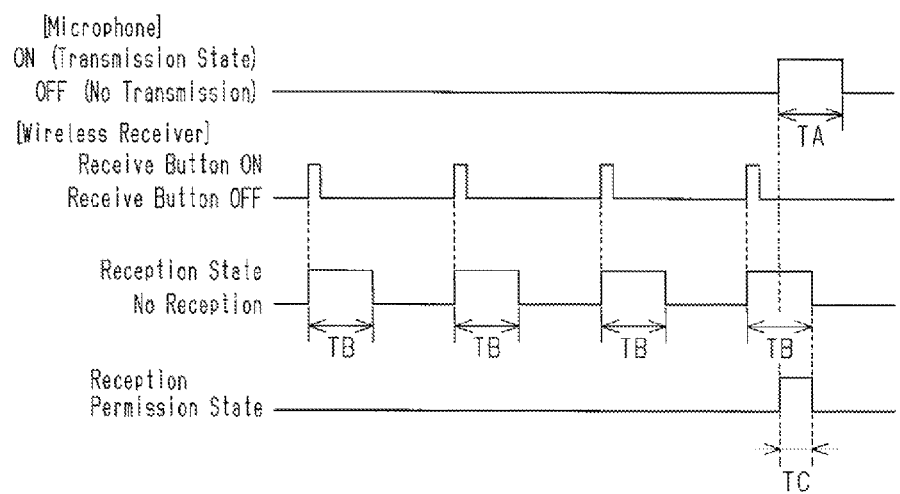
FIGS. 12A and 12B illustrate a timing chart showing the relationship of a transmission state of a microphone and a reception state of a wireless receiver according to the fourth embodiment.

FIG. 12A shows a state when the transmission period of the privacy setting transmission signal SAX of the microphone 10 overlaps the reception period of the wireless receiver 30 in coincidence, in a case where the receive button 46 is repeatedly pushed to repeat the setting of the privacy setting mode MDB under the condition that the setting of the privacy setting mode MDB is not prohibited regardless of the non-reception number KX.

When a third party attempts to receive the privacy setting transmission signal SAX, the setting of the privacy setting mode MDB is repeated. For example, as shown in FIG. 12A, the receive button 46 is repeatedly pushed to intermittently set the wireless receiver 30 in the reception state. This increases opportunities (receivable period TC) in which the transmission period of the privacy setting transmission signal SAX of the microphone 10 overlaps the reception period of the wireless receiver 30. FIG. 12A shows that the receivable period TC is set when the receive button 46 is pushed four times.

Figure 12B:
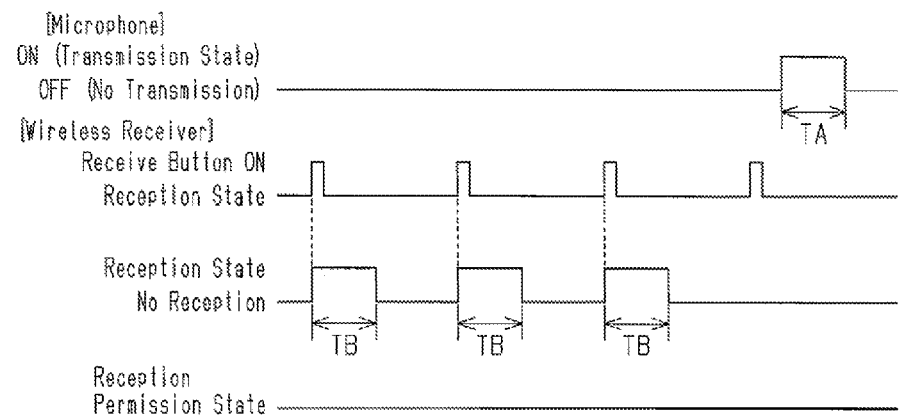

FIG. 12B shows that the period (receivable period TC) in which the transmission period of the privacy setting transmission signal SAX of the microphone 10 overlaps with the reception period of the wireless receiver 30 is avoided, in a case where the receive button 46 is intermittently pushed to repetitively set the privacy setting mode MDB under the condition that the setting of the privacy setting mode MDB is prohibited after the non-reception number KX exceeds three times.

When a third party attempts to receive the privacy setting transmission signal SAX, the setting of the privacy setting mode MDB is repeated. For example, as shown in FIG. 12B, the receive button 46 is repeatedly pushed to intermittently set the wireless receiver 30 in the reception state. However, as shown in FIG. 12B, the wireless receiver 30 is set to the privacy setting mode MDB three times, and the privacy setting transmission signal SAX is not received three times. Thus, subsequent setting to the privacy setting mode MDB is prohibited. This invalidates subsequent pushing operations of the receive button 46, and the wireless receiver 30 cannot be set in the privacy setting mode MDB. Therefore, even if the privacy setting transmission signal SAX is transmitted, the wireless receiver 30 cannot receive the privacy setting transmission signal SAX.

The present embodiment has the following advantage in addition to advantages (1) to (3), (5), and (9) of the first embodiment.

(8) In the present embodiment, when the number of times the privacy setting transmission signal SAX is not successively received (non-reception number KX) reaches the set number KA, the operation of switching the wireless receiver 30 to the privacy setting mode MDB is invalidated.

If the wireless receiver 30 is set to the privacy setting mode MDB when the microphone 10 is in the privacy setting mode MDB, the wireless receiver 30 can receive the privacy setting transmission signal SAX. Thus, as long as the user is authorized, the operation is needed only once to switch the wireless receiver 30 to the setting mode MDB. When the privacy unique word UWX is not successively received, it may be presumed that a normal operation is not being performed. In other words, it can be predicted that there is a high probability of a third party using the wireless receiver 30 for eavesdropping. Accordingly, in the configuration described above, the operation for switching to the privacy setting mode MDB is invalidated when the privacy setting transmission signal SAX is successively not received for the set number KA. It thus becomes difficult for the third party to continue using the wireless receiver 30, and eavesdropping of the privacy unique word UWX is suppressed.

Fifth Embodiment

Figure 13:
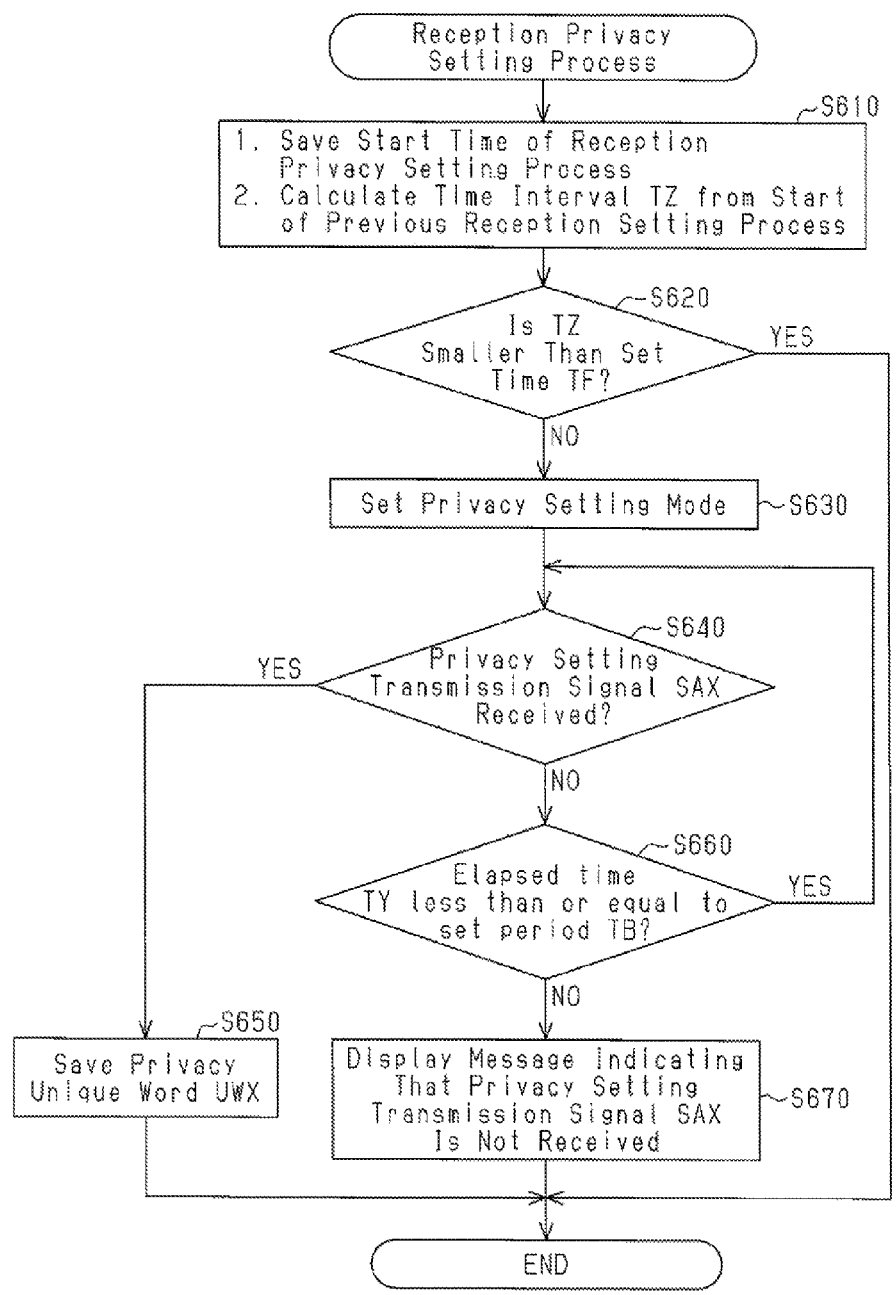
FIG. 13 is a flowchart of a reception privacy setting process executed in a wireless receiver of a fifth embodiment of the present invention.

A fifth embodiment of the present invention will be described with reference to FIG. 13.

In the wireless microphone system 1 of the present embodiment, the following changes are made to the configuration of the first embodiment. In other words, in the first embodiment, when the receive button 46 is repeatedly and continuously pushed while the wireless receiver 30 is set to the privacy setting mode MDB, the privacy setting mode MDB can be substantially extended. However, if such an operation is permitted, a third party may maintain the wireless receiver 30 in the privacy setting mode MDB for a long time to acquire the privacy unique word UWX transmitted from the microphone 10. This increases the possibility of the privacy setting transmission signal SAX being acquired by the third party. Accordingly, in the present embodiment, a control is executed to suppress prolonging of the period in which the wireless receiver 30 is set to the privacy setting mode MDB when the receive button 46 is continuously pushed. The changes from the configuration of the first embodiment will now be described. Same reference numerals are given to those components that are the same as the corresponding components of the first embodiment. Such components will not be described in detail.

When the switch 42 of the operation unit 40 is switched to the privacy setting mode MDB and the receive button 46 is pushed, in step S610, the start time of this process is saved and a time interval TZ from the start of the previous reception privacy setting process is calculated. The time interval TZ is obtained as the difference between the previous start time of the reception privacy setting process and the current start time of the reception privacy setting process.

In step S620, it is determined whether or not the time interval TZ is smaller than a set time TF. If an affirmative determination is made, the reception privacy setting process is terminated. In other words, the process for receiving the privacy setting transmission signal SAX is prohibited.

If a negative determination is made in step S620, that is, if assumed that the receive button 46 is not continuously pushed in the set time TF, step S630 to step S670 are processed. This series of steps is similar to the processing of step S210 to step S250 of the first embodiment.

The present embodiment has the following advantage in addition to advantages (1) to (3), (5), and (9) of the first embodiment.

(9) In the present embodiment, if the operation of switching the wireless receiver 30 to the privacy setting mode MDB is performed two times (set number including first operation) during the set time TF, subsequent operations for switching the wireless receiver 30 to the privacy setting mode MDB is invalidated.

When a third party intends to intercept the privacy unique word UWX (privacy additional information) using the wireless receiver 30, the operation for setting the privacy setting mode MDB may continuously be performed to maintain the wireless receiver 30 in the privacy setting mode MDB. In the present configuration, on the other hand, when the operation of switching to the privacy setting mode MDB is continuously performed, subsequent operations are invalidated. Thus, it becomes difficult to continuously perform the operation for setting the privacy setting mode MDB. This suppresses eavesdropping of the privacy unique word UWX.

Other Embodiments

The embodiments of the present invention may be modified as described below. Further, the modifications may be combined.

In the first embodiment described above, the computing unit 27 creates a random number to form a new unique word (hereinafter referred to as privacy unique word UWX) in the privacy setting mode MDB. The privacy unique word UWX may also be formed in the following manner.

Specifically, a plurality of privacy unique words UWX is stored in advance in the memory 28 of the microphone 10. The microphone 10 randomly selects one of the privacy unique words UWX whenever the privacy setting mode MDB is set, and forms the privacy setting transmission signal SAX and the privacy transmission signal SAY using the selected privacy unique word UWX. When set to the privacy setting mode MDB, the wireless receiver 30 updates the previous privacy unique word UWX with the newly received privacy unique word UWX whenever the reception of the privacy unique word UWX is successful. The privacy setting transmission signal SAX and the privacy transmission signal SAY are processed using the privacy unique word UWX.

In this configuration, the microphone 10 randomly selects one of the stored privacy unique words UWX whenever the privacy setting mode MDB is set, thus making it difficult for a third party to predict the privacy unique word UWX. This further suppresses eavesdropping by a third party.

In the first embodiment described above, the radio wave intensity when transmitting the privacy setting transmission signal SAX is set to be smaller than the radio wave intensity in the normal communication mode MDA. Instead of such control, the radio wave intensity when transmitting the privacy setting transmission signal SAX may be set be larger than or the same as the radio wave intensity in the normal communication mode MDA. In this case, the period of transmitting the privacy setting transmission signal SAX may be shortened so that the period in which the privacy setting transmission signal SAX may be intercepted by a third party is shortened.

In the first embodiment described above, the privacy setting mode MDB is started when the receive button 46 is pushed, and the privacy setting mode MDB is terminated after the starting when the set period TB ends. In other words, the time in which the privacy setting mode MDB is maintained is a constant period. Instead of such a control, the microphone 10 and the wireless receiver 30 may be set to the privacy setting mode MDB in accordance with the operation through (on) the operation units 12 and 40, and the wireless receiver 30 may receive the privacy setting transmission signal SAX only as long as the operation on the operation unit 40 is maintained.

Specifically, a control may be performed so that the privacy setting mode MDB is maintained while the receive button 46 is being pressed. According to such control, the privacy setting mode MDB can be maintained until the wireless receiver 30 receives the privacy setting transmission signal SAX. This improves convenience for the user.

Instead of prolonging the period for maintaining the privacy setting mode MDB, the period may be shortened. In other words, since the wireless receiver 30 is configured to receive the privacy setting transmission signal SAX only while the receive button 46 is pressed, that is, only as long as the operation unit 40 is operated in the privacy setting mode MDB, the reception of the privacy setting transmission signal SAX can be stopped by interrupting the operation of the operation unit 40.

Such operation is useful in the following cases. For example, the privacy setting may be interfered by a third party using another microphone 10, which is not used in the wireless microphone system 1, sets the another microphone 10 in the privacy setting mode MDB and transmits a dummy privacy setting transmission signal SAX. However, even when such an interference operation is performed, interference may be suppressed by arbitrarily shortening the operation period of the operation unit 40 of the wireless receiver 30.

In the first embodiment described above, additional information to add to the audio signal is used to counter eavesdropping. In other words, in the privacy communication mode MDC, the use of the unique word UW that differs from the unique word UW used in the normal communication mode MDA suppresses eavesdropping by a third party. Instead of such a configuration, an encryption key, which serves as additional information added to the audio signal, may be changed between two modes to suppress eavesdropping by a third party.

Specifically, (1) in the normal communication mode MDA, when transmitting the audio signal, the audio signal is first encoded with a normal encryption key (normal key information KEN), the normal key information KEN is added to the audio signal that is encoded (hereinafter referred to as encoded audio signal), and then the encoded audio signal is transmitted as the normal transmission signal SAU. The normal key information KEN is saved in advance in the microphone 10 and the wireless receiver 30. When the wireless receiver 30 receives the encoded audio signal, the encoded audio signal is extracted using the normal key information KEN and the encoded audio signal is decoded using the normal key information KEN.

(2) In the privacy setting mode MDB, the encryption key information (hereinafter referred to as privacy key information KEX) differing from the normal key information KEN is formed. When transmitting the privacy key information KEX, the privacy key information KEX is first encoded with the normal key information KEN to form encoded privacy key information KEXX, the normal key information KEN is added to the encoded privacy key information KEXX to generate the privacy setting transmission signal SAX, and then the privacy setting transmission signal SAX is transmitted. When the wireless receive 30 receives the privacy setting transmission signal SAX, the encoded privacy key information KEXX is extracted using the normal key information KEN, and the encoded privacy key information KEXX is decoded using the normal key information KEN to obtain the privacy key information KEX. The privacy key information KEX is then saved in the memory 56.

(3) In the privacy communication mode MDC, when transmitting the audio signal, the audio signal is first encoded with the privacy key information KEX, the privacy key information KEX is added to the encoded audio signal to generate the privacy transmission signal SAY, and then the privacy transmission signal SAY is transmitted. When the wireless receiver 30 receives the privacy transmission signal SAY, the audio signal encoded with the privacy key information KEX is extracted and the encoded audio signal is decoded using the privacy key information KEX.

In the modifications described above, (1) in the normal communication mode MDA, the audio signal is encoded with the normal key information KEN, but the normal communication may be performed without performing the encoding.

According to the configuration described above, in the privacy setting mode MDB, the privacy key information KEX is transmitted from the microphone 10 to the wireless receiver 30 by transmitting the privacy transmission signal SAY from the microphone 10. In the privacy communication mode MDC, the microphone 10 and the wireless receiver 30 communicate using the privacy key information KEX. Thus, in the privacy communication mode MDC, the communication between the microphone 10 and the wireless receiver 30 encodes the audio signal and uses the privacy key information KEX differing from that in the normal communication mode MDA. This further suppresses interception of the transmission signal from the microphone 10 by the wireless receiver of a third party.

In the second embodiment described above, the control is performed such that the microphone 10 cannot continuously transmit the privacy setting transmission signal SAX. Instead of such control, the operations that cause the microphone 10 to continuously transmit the privacy setting transmission signal SAX may be permitted until reaching a predetermined number of times. For example, a control may be executed to permit three continuous operations for transmitting the privacy setting transmission signal SAX, and prohibiting four or more continuous operations. In such a control, even if the reception of the privacy setting transmission signal SAX by the wireless receiver 30 fails due to the erroneous operation of the user, the privacy setting transmission signal SAX can be transmitted again from the microphone 10 immediately afterward.

In the third embodiment described above, the reception prohibiting period TE starts when the series of processing in the privacy setting mode MDB is terminated. Thus, the control is performed to prevent continuous receptions of the privacy setting transmission signal SAX, but the following control may be performed in place of such control. Specifically, instead of starting the reception prohibiting period TE whenever the reception privacy setting process is executed, the reception prohibiting period TE may be started when the reception privacy setting process is executed for a predetermined number of times.

In the fourth embodiment described above, when the failure (no-reception) of the reception of the privacy setting transmission signal SAX is repeated for a predetermined number of times or more, the control is performed to prevent the wireless receiver 30 from being set to the privacy setting mode MDB thereafter. Instead of such a control, the wireless receiver 30 may be prohibited from being set to the privacy setting mode MDB when the reception of the privacy setting transmission signal SAX successively fails. The successive reception failure in this case indicates that there is no successful reception between the first reception failure and the following second reception failure.

In the fifth embodiment described above, the privacy setting mode MDB is terminated when the receive button 46 is pushed again within the set time TF after the receive button 46 is pushed. This suppresses an action of a third party continuously pushing the receive button 46 to extend the reception state of the wireless receiver 30. Instead of such control or in addition to such control, a control for terminating the privacy setting mode MDB may be performed when the switch 42 is operated to switch again to the privacy setting mode MDB within the set time TF from when the switch 42 is switched to the privacy setting mode MDB. This suppresses a situation in which the privacy setting mode MDB is temporarily switched to another mode, and then the another mode is changed back to the privacy setting mode MDB to maintain the reception state for receiving the privacy setting transmission signal SAX.

In each embodiment described above, the normal unique word UWN and the privacy unique word UWX are used in correspondence with the unique word UW used to locate the position of the audio digital signal SD. In place of such method, a new parameter (unique word) may be provided to the audio digital signal SD, apart from the above type of unique word UW, and such parameter may be switched to the normal unique word UWN and the privacy unique word UWX of the first embodiment. For example, the transmission signal of the normal communication mode may be configured to include the normal unique word UWN, the new unique word (hereinafter referred to as new unique word UWA), and the audio digital signal. The transmission signal of the privacy setting mode is configured including the normal unique word UWN, the new unique word UWA, and the privacy unique word UWX. The transmission signal of the privacy communication mode is configured including the privacy unique word UWX, the new unique word UWA, and the audio digital signal. The new unique word UWA is used to locate the position where the audio digital signal and the privacy unique word in the transmission signal are stored.

The microphone control unit (e.g., computing unit 27) and the receiver control unit (e.g., computing unit 55) may have a timer function. A determination reference value such as the set period TA, and the like may be stored in the microphone control unit (e.g., memory 28). The determination criterion value such as the set period TB, the set time TF, the set number KA, the reference reception level, and the like may be stored in the receiver control unit (e.g., memory 56).

The invention claimed is:

1. A wireless microphone system including a microphone that transmits a transmission signal, which contains an audio signal and additional information for processing the audio signal, and a wireless receiver, which receives the transmission signal and processes the audio signal contained in the received transmission signal based on the additional information, the wireless microphone system comprising:
   a normal communication mode in which the microphone and the wireless receiver communicate with each other using normal additional information as the additional information that is set in advance in the microphone and the wireless receiver;
   a privacy setting mode in which the microphone sets privacy additional information that differs from the normal additional information in the microphone and transmits the privacy additional information to the wireless receiver; and
   a privacy communication mode in which the microphone and the wireless receiver communicate with each other using the privacy additional information serving as the additional information set in the microphone and the wireless receiver in the privacy setting mode.

2. The wireless microphone system according to claim 1, wherein
   the microphone includes a transmission unit that transmits a normal transmission signal in which the normal additional information is added to the audio signal, a privacy transmission signal in which the privacy additional information is added to the audio signal, and a privacy setting transmission signal in which the normal additional information is added to the privacy additional information; the wireless receiver includes a reception unit that receives the normal transmission signal, the privacy transmission signal, and the privacy setting transmission signal;

the normal communication mode is a mode in which the microphone transmits the normal transmission signal through the transmission unit, and the wireless receiver receives the normal transmission signal with the reception unit;

the privacy setting mode is a mode in which the microphone transmits the privacy setting transmission signal through the transmission unit, and the wireless receiver receives the privacy setting transmission signal with the reception unit; and the privacy communication mode is a mode in which the microphone transmits the privacy transmission signal through the transmission unit, and the wireless receiver receives the privacy transmission signal with the reception unit.

3. The wireless microphone system according to claim 2, wherein:

in the privacy setting mode, the microphone transmits the privacy setting transmission signal throughout a set time after the privacy setting mode starts and saves the privacy additional information contained in the privacy setting transmission signal;

in the privacy communication mode, the microphone forms the privacy transmission signal using the saved privacy additional information and transmits the privacy transmission signal;

in the privacy setting mode, the wireless receiver saves the privacy additional information contained in the privacy setting transmission signal when receiving the privacy setting transmission signal from the microphone; and in the privacy communication mode, the wireless receiver processes the privacy transmission signal using the saved privacy additional information.

4. The wireless microphone system according to claim 2, wherein, the microphone randomly forms the privacy additional information whenever the privacy setting mode is set, and forms the privacy setting transmission signal and the privacy transmission signal using the formed privacy additional information; and whenever successfully receiving the privacy additional information while set in the privacy setting mode, the wireless receiver updates the saved privacy additional information with the newly received privacy additional information, and processes the privacy setting transmission signal and the privacy transmission signal using the updated privacy additional information.

5. The wireless microphone system according to claim 2, wherein:

the microphone stores multiple pieces of privacy additional information, randomly selects one of the pieces of privacy additional information whenever the privacy setting mode is set, and forms the privacy setting transmission signal and the privacy transmission signal using the selected privacy additional information; and whenever successfully receiving the privacy additional information while set in the privacy setting mode, the wireless receiver updates the saved privacy additional information with the newly received privacy additional information, and processes the privacy setting transmission signal and the privacy transmission signal using the updated privacy additional information.

6. The wireless microphone system according to claim 2, wherein:

the microphone and the wireless receiver each include an operation unit through which the privacy setting mode is set;

the microphone and the wireless receiver are each set in the privacy setting mode in correspondence with operation through the corresponding operation unit; and in the privacy setting mode, the wireless receiver receives the privacy setting transmission signal only when the operation unit of the wireless receiver is continuously operated.

7. The wireless microphone system according to claim 2, wherein:

the additional information is a unique word for detecting the audio signal;

the normal transmission signal is obtained by adding a normal unique word as the normal additional information to the audio signal;

the privacy transmission signal is obtained by adding a privacy unique word as the additional information, which differs from the normal unique word, to the audio signal; and the privacy setting transmission signal is obtained by adding the normal unique word to the privacy unique word.

8. The wireless microphone system according to claim 2, wherein:

the microphone encodes the audio signal with key information as the additional information to form an encoded audio signal, adds the key information to the encoded audio signal, and transmits the encoded audio signal;

the normal transmission signal is obtained by adding normal key information as the normal additional information to the encoded audio signal;

the privacy transmission signal is obtained by adding privacy key information as the additional information, which differs from the normal key information, to the encoded audio signal; and the privacy setting transmission signal is obtained by adding the normal key information to the privacy key information.

9. The wireless microphone system according to claim 1, wherein execution of the privacy setting mode is prohibited from when the privacy setting mode of the microphone is terminated until when a transmission prohibiting period ends.

10. The wireless microphone system according to claim 1, wherein execution of the privacy setting mode is prohibited from when the privacy setting mode of the wireless receiver is terminated until when a reception prohibiting period ends.

11. The wireless microphone system according to claim 1, wherein, if the wireless receiver, which is in the privacy setting mode, successively fails to receive the transmission signal from the microphone a set number of times, an operation for setting the wireless receiver to a privacy setting mode is invalidated.

12. The wireless microphone system according to claim 1, wherein when operations for setting the wireless receiver to the privacy setting mode are performed for a set number of times within a set period, a subsequent operation for setting the wireless receiver to the privacy setting mode is invalidated.

13. The wireless microphone system according to claim 1, wherein when the microphone is in the privacy setting mode, and a reception signal received by the wireless receiver is smaller than a reference reception level, the wireless receiver does not process the reception signal.

14. The wireless microphone system according to claim 1, wherein a radio wave intensity of when the microphone transmits a transmission signal in the privacy setting mode is set to be smaller than a radio wave intensity of when a transmission signal is transmitted in the normal communication mode.

* * * * *